Jan. 2, 1968  J. DONIGER ET AL  3,361,392
AIRCRAFT CONTROL SYSTEM FOR LATERAL RUNWAY ALIGNMENT
Filed Oct. 5, 1965  2 Sheets-Sheet 1

INVENTORS
JERRY DONIGER
BERNARD HANISCH
ERVIN SCHOENBLUM
BY
ATTORNEY

INVENTORS
JERRY DONIGER
BERNARD HANISCH
ERVIN SCHOENBLUM
BY
ATTORNEY

United States Patent Office 3,361,392
Patented Jan. 2, 1968

3,361,392
AIRCRAFT CONTROL SYSTEM FOR LATERAL
RUNWAY ALIGNMENT
Jerry Doniger, Montvale, N.J., Bernard Hanisch, Bronx,
N.Y., and Ervin Schoenblum, Elizabeth, N.J., assignors
to The Bendix Corporation, a corporation of Delaware
Filed Oct. 5, 1965, Ser. No. 493,091
19 Claims. (Cl. 244—77)

ABSTRACT OF THE DISCLOSURE

Apparatus for aligning an aircraft with the center line of a runway. Heading displacement and synchronized heading displacement signals are summed. The summation signal is combined with a yaw rate signal for providing a rudder control signal and is combined with a roll attitude signal for providing an aileron control signal. The aircraft is aligned in response to the rudder and aileron control signals.

---

This invention relates to flight control systems and, more particularly, to flight control systems for aligning an aircraft with the center line of a runway.

When an aircraft lands automatically with a prevailing crosswind, the aircraft heads angularly into the wind to maintain alignment with the center line of the runway. The main wheel axis of the aircraft has a drift velocity which generates side loads on the landing gear at touchdown, thereby subjecting the landing gear to undue strain.

The present invention eliminates this condition by providing a compensating alignment maneuver, just prior to touchdown, which utilizes heading displacement signals to change the aircraft heading toward the runway center line through rudder control, with the aircraft wings maintained in essentially a level attitude through aileron control. The heading displacement signals are used in such a way so as to maintain steady rudder deflection. The maneuver is initiated at a predetermined altitude prior to touchdown as indicated by a radio altimeter, and is used with either an automatic pilot or flight director system.

One object of this invention is to provide means for aligning the longitudinal axis of the aircraft with the center line of the runway, with a prevailing crosswind, during the landing maneuver.

Another object of this invention is to minimize loads on the wheel axis of an aircraft caused by prevailing crosswinds during a landing maneuver.

Another object of this invention is to utilize heading displacement signals to control an automatic pilot or flight director during the landing maneuver.

Another object of this invention is to align the longitudinal axis of the aircraft with the center line of the runway by providing steady rudder deflection and wings level attitude.

The present invention contemplates a device for aligning the aircraft with the center line of the runway by summing heading displacement and synchronized heading displacement signals to generate combined heading displacement signals. The combined heading displacement signals are combined with yaw rate signals to generate rudder control signals and are combined with roll attitude signals to generate aileron control signals. These control signals are used to provide the required alignment.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In reference to the drawings, wherein corresponding parts have been indicated by corresponding numerals:

Figures 1A, 1B:
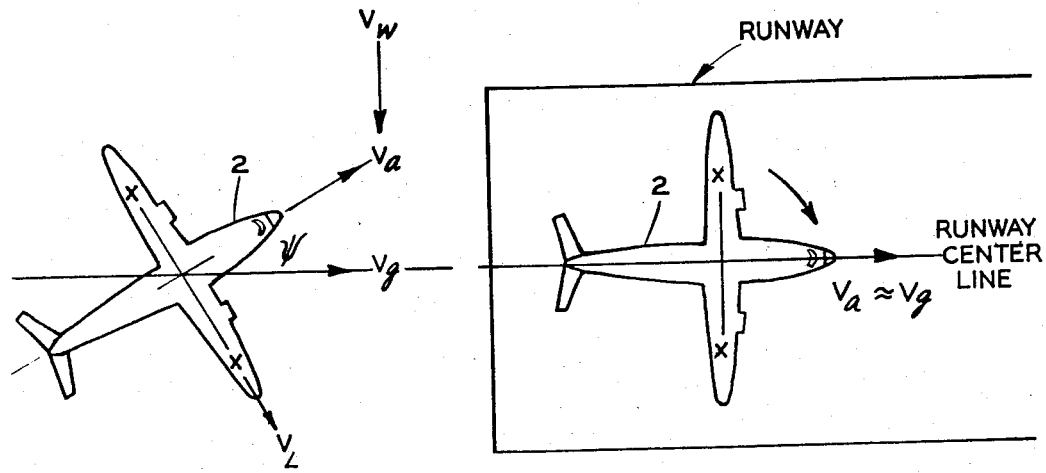
FIGURE 1A is a diagrammatic representation of an aircraft approaching a runway under prevailing crosswind conditions.
FIGURE 1B is a diagrammatic representation of the aircraft of FIGURE 1A, with its longitudinal axis aligned with the center line of the runway by a device constructed according to the present invention.

An analysis of the runway alignment maneuver may be made with reference to FIGURES 1A and 1B. The heading of an aircraft 2, with a prevailing crosswind indicated by a vector $V_W$, is represented by a velocity vector $V_a$, as shown in FIGURE 1A. The aircraft flight path, as established by a localizer beam, is indicated by a vector $V_g$ which is normally coincident with the center line of the runway. The crab angle, or heading displacement, $\psi$, is the angle between velocity vector $V_a$ and the runway centerline necessary to compensate for the prevailing crosswind $V_W$. The main wheel axis $x$—$x$ of the aircraft is subjected to a drift velocity $V_L$ which may be defined by the following equation:

$$V_L = V_a \tan \psi$$

If aircraft 2 lands in this attitude, side loads are generated on the landing gear which could cause structural damage. In order to minimize this effect, a decrab maneuver must be initiated to orient aircraft 2 so that, at touchdown, drift velocity $V_L$ approaches zero, and $V_a$ and $V_g$ are coincident as indicated in FIGURE 1B.

Normal approach maneuver

Figure 2:
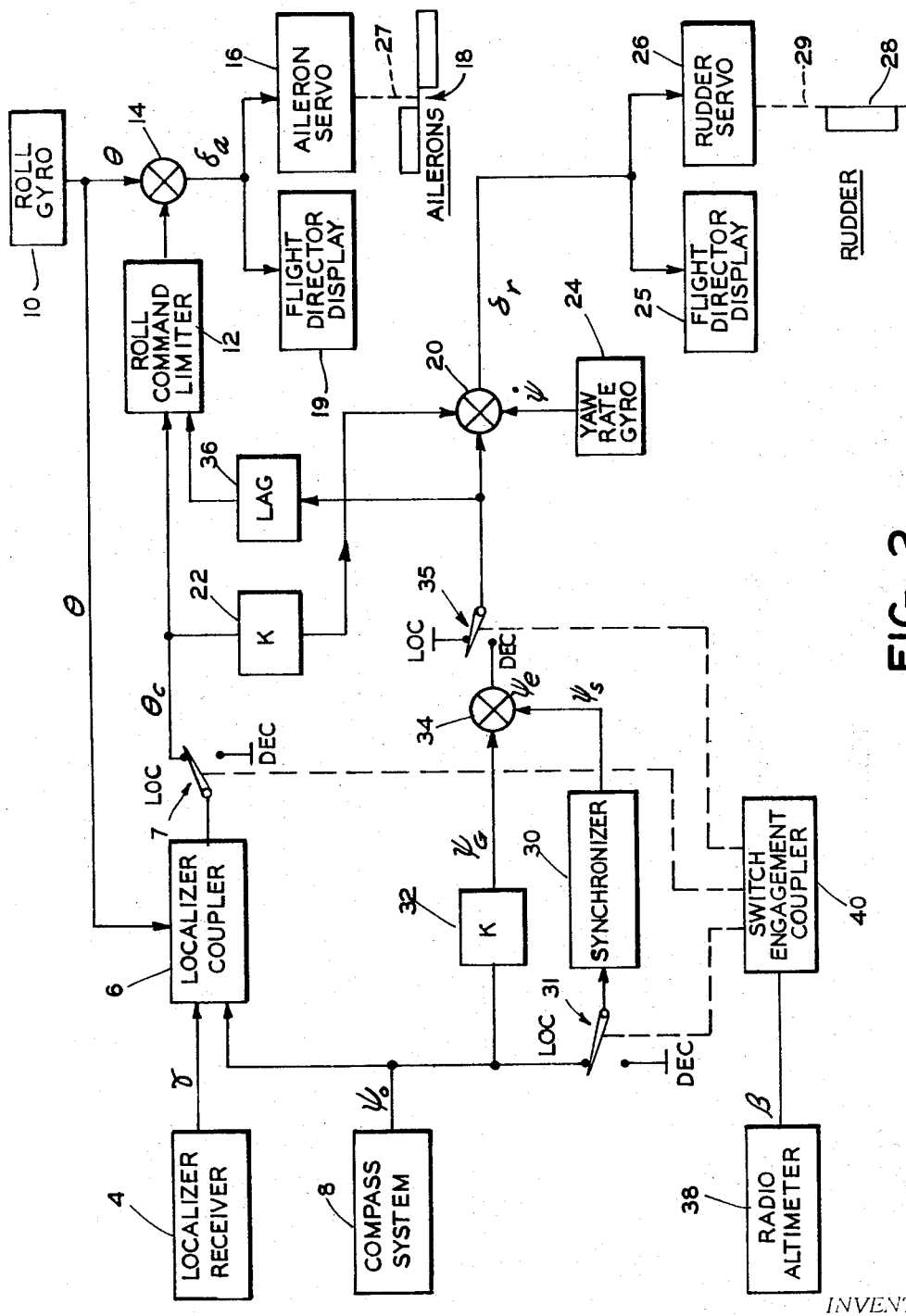
FIGURE 2 is a block diagram of an aircraft control system, including means constructed according to the present invention, for aligning the longitudinal axis of the aircraft with the center line of the runway.

In reference to FIGURE 2, a localizer receiver 4 provides a track deviation signal $\gamma$ referenced to the runway center line shown in FIGURES 1A and 1B. Signal $\gamma$ is directed to a localizer coupler 6, of a conventional type, where it is modulated so as to be provided with alternating current characteristics, appropriately limited, and summed with a heading displacement signal $\psi_0$ from a compass system 8, and a roll attitude signal $\theta$ from a roll gyro 10. Signal $\psi_0$ corresponds to the heading of the aircraft relative to the runway heading, with the latter heading manually set by the pilot. Localizer coupler 6 generates a modulated roll command $\theta_c$ to fly the aircraft along a localizer beam.

Signal $\psi_0$ from compass system 8 is applied to a gain adjustment circuit 32 to provide a gain adjusted heading displacement signal $\psi_G$ and is applied through a switch 31 in localizer position to a synchronizer 30. During the approach maneuver synchronizer 30 provides a synchronizer signal $\psi_s$ which follows heading displacement signal $\psi_0$.

Modulated roll command signal $\theta_c$ is received by a roll command limiter 12 where it is limited to a safe value. The limited, modulated roll command signal is directed to a summation point 14 where it is combined with roll attitude command signal $\theta$ from roll gyro 10. The signal at summation point 14 represents a roll control signal $\delta_a$ which is transmitted to a display indicator 19 of a flight director system for manual control of ailerons 18, or to aileron servo mechanism 16 for automatic control of ailerons 18 through a suitable mechanical linkage 27.

Roll command signal $\theta_c$ is coupled to summation point 20 through a gain circuit 22 where it is combined with a heading rate signal $\dot{\psi}$ from a yaw rate gyro 24. The signal at summation point 20 is a rudder control signal $\delta_r$ which is transmitted to a display indicator 25 of a flight control system for manual control of a rudder 28, or to rudder servo mechanism 26 for automatic control of rudder 28 through a suitable mechanical linkage 29.

*Decrab maneuver*

During the decrab maneuver, switch 31 is actuated to disconnect synchronizer 30 from compass system 8, with synchronizer 30 then providing synchronizer signal $\psi_s$ at a constant level corresponding to the level of heading displacement signal $\psi_0$ just prior to initiation of the decrab maneuver. Signal $\psi_G$ and signal $\psi_s$ are added at a summation point 34 to provide a combined heading displacement signal $\psi_e$ which is coupled to summation point 20 where it is combined with heading rate signal $\dot{\psi}$ from yaw rate gyro 24 to provide rudder signal $\delta_r$.

Signal $\psi_e$ is directed through a lag circuit 36, for purposes hereinafter described, and through roll command limiter 12 where it is limited to a safe value by providing for adjustment of roll command limiter 12 as a function of radio altitude from a radio altimeter 38. The output of roll command limiter 12 is directed to summation point 14 where it is combined with roll attitude signal $\theta$ from vertical gyro 10 to provide roll control signal $\delta_a$.

The decrab maneuver is initiated as a function of altitude. At an altitude of about fifty feet, an altitude displacement signal $\beta$, from radio altimeter 38, energizes a switch engagement coupler 40 which moves switches 7, 31 and 35 from localizer to decrab position.

In decrab position, switch 7 disconnects roll command signal $\theta_c$ from the aileron control and rudder control channels, and switch 35 applies heading error signal $\psi_e$ to the rudder control channel and to the aileron control channel through lag circuit 36. Synchronizer 30 is disconnected from compass system 8 by switch 31 to provide signal $\psi_s$ at the heretofore noted constant level.

Signal $\delta_r$ deflects rudder 28 to yaw the aircraft so as to null heading displacement constant signal $\psi_0$ from compass system 8. Signal $\psi_s$, from synchronizer 30, steadily deflects rudder 28 to prevent the aircraft from heading angularly into the wind.

Lag circuit 36 acts to generate aileron control signal $\delta_a$ so as to minimize the aerodynamically induced rolling moment caused by the slide slip resulting from yawing of the aircraft. If this slide slip remains unaccommodated, then aircraft drift velocity $V_L$ shown in FIGURE 1, reduced to a safe value by the heretofore noted rudder action, would rapidly rise again. The gain of lag circuit 36 can be adjusted to provide essentially a wings level decrab maneuver, or an overcompensation can be accomplished to force the upwind wing slightly downward. This overcompensation is desirable if the resulting roll attitude can be kept within 2 or 3 degrees, since under these conditions drift velocity $V_L$ is minimized for a longer period of time as illustrated by FIGURE 3.

Figure 3:
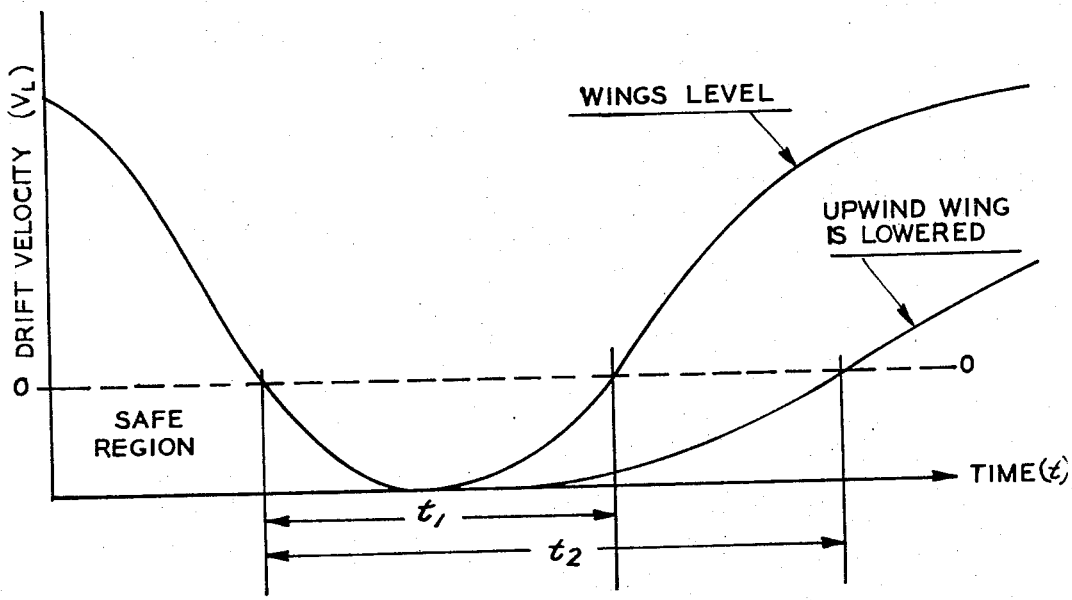
FIGURE 3 is a graphical illustration of the variation of aircraft drift velocity, caused by a prevailing crosswind, with time, for wings level and upwind wing lowered conditions.

The abscissa of the graphical representation of FIGURE 3 represents time $t$, while the ordinate represents drift velocity $V_L$. Under constant crosswind conditions, the safe region for drift velocity $V_L$ is represented by the area of the graph below the line O—O. With wings level, this safe period lasts for a period of time $t_1$, while, with the upwind wing slightly lowered, the safe period is lengthened to time $t_2$.

*Operation*

The decrabing device constructed in accordance with the present invention is contemplated for use with an automatic pilot or flight director system. The device is effective when the aircraft is making a radio controlled approach to a runway under prevailing crosswind conditions.

At some particular altitude as indicated by radio altimeter 38 shown in FIGURE 2, the control of the aircraft is automatically switched from the normal localizer coupler device to the decrabing device of the present invention.

When this occurs, heading displacement signal $\psi_0$ is modified to provide gain adjusted heading displacement signal $\psi_G$, and is synchronized to provide synchronized heading displacement signal $\psi_s$ at a constant level corresponding to the level of heading displacement signal $\psi_0$ just prior to initiation of the decrab maneuver. Signals $\psi_G$ and $\psi_s$ are added to provide combined heading displacement signal $\psi_e$. Signal $\psi_e$ is utilized to derive a rudder control signal $\delta_r$ which controls the yaw attitude of the aircraft, and an aileron control signal $\delta_a$ which controls the roll attitude. The respective aileron and rudder control signals, $\delta_a$ and $\delta_r$, actuate an automatic pilot system, or an indicator in a flight director system.

A significant feature of the device of the present invention is that it can provide the aircraft with wings level flight, or provide a slight lowering of the upwind wing. This control is made by adjusting the gain of lag circuit 36 which receives signal $\psi_e$. The wing-lowered condition is desirable since it provides that the lateral deviation of the landing gear of the aircraft from the runway center line, as shown in FIGURE 1, may be controlled more precisely and for a longer period of time, as graphically illustrated in FIGURE 3.

An important part of an aircraft landing system is the means for providing runway alignment or decrab control. The purpose of such control is to provide for safe reliable touchdown of the aircraft. Such control insures that the landing gear of the aircraft is subjected to only reasonable side loads by providing that the drift velocity of the landing gear due to crosswind conditions is minimized. The present invention provides an important addition to a safe, reliable aircraft landing system.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An aircraft landing system comprising means for providing heading displacement signals, means connected to said heading displacement signal means for providing synchronizing signals, means for combining said displacement and synchronizing signals to provide combined signals, and rudder control means and aileron control means receiving said combined signals and operating in response thereto to control the aircraft during the landing maneuver.

2. A landing system as defined in claim 1 which includes a lag network for receiving the combined signal to provide a lagging combined signal, and means for applying the lagging combined signal to the aileron control means.

3. A system for landing an aircraft, comprising means for providing displacement signals corresponding to aircraft heading, means for receiving said displacement signals to provide synchronizing signals, means for summing said displacement and synchronizing signals to provide combined signals, means for providing heading rate signals, means for summing the combined signals and heading rate signals to provide rudder control signals, means for providing roll attitude signals, means for summing the combined signals and roll attitude signals to provide aileron control signals, and means responsive to said rudder and aileron control signals to control the aircraft during the landing maneuver.

4. A system for aligning the longitudinal axis of the aircraft with the center line of the runway during a landing maneuver, comprising means for providing displacement signals corresponding to aircraft heading, means for receiving said displacement signals to provide synchronizing signals, means for summing said displacement and synchronizing signals to provide combined signals, and rudder control means and aileron control means receiving said combined signals and operating in response thereto to control the aircraft during the landing maneuver.

5. A system for landing an aircraft, comprising means for providing displacement signals corresponding to aircraft heading, means for synchronizing said displacement signals to provide synchronizing signals, means for summing said displacement and synchronizing signals to provide combined signals, means for providing heading rate signals, means for combining the combined signals and heading rate signals to provide first control signals, means for providing roll attitude signals, means for combining the combined signals and roll attitude signals to provide second control signals, and means responsive to said first and second control signals to control the aircraft during the landing maneuver.

6. An aircraft landing system comprising means for providing heading displacement signals, means connected to said heading displacement signal means for providing synchronizing signals, means for combining said displacement and synchronizing signals to provide combined signals, and means receiving said combined signals and operating in response thereto to control the aircraft during the landing maneuver.

7. A system for landing an aircraft, comprising means for aligning the longitudinal axis of the aircraft with the center line of the runway, said means including means for providing displacement signals corresponding to aircraft heading, means for receiving said displacement signals to provide synchronizing signals, means for summing said displacement and synchronizing signals to provide combined signals, and means receiving said combined signals and operating in response thereto to control the aircraft during the landing maneuver.

8. A system for aligning the longitudinal axis of an aircraft with the center line of a runway, comprising means for providing displacement signals corresponding to aircraft heading, means for receiving said displacement signals to provide synchronizing signals, means for summing said displacement and synchronizing signals to provide combined signals, and rudder control means and aileron control means receiving said combined signals and operating in response thereto to control the aircraft during the alignment maneuver.

9. An aircraft landing system comprising approach coupler means and runway alignment means, said runway alignment means including means for providing displacement signals corresponding to aircraft heading, means for receiving said displacement signals to provide synchronizing signals, means for summing said displacement and synchronizing signals to provide combined signals, and rudder control means and aileron control means receiving said combined signals and operating in response thereto to align the longitudinal axis of the aircraft with the center line of the runway.

10. The combination defined by claim 9 in which the means for receiving said displacement signals to provide synchronizing signals comprises means for receiving said displacement signals during the approach coupler mode, means for synchronizing said received signals, and means for providing said synchronized signals during the runway alignment mode of operation.

11. A system for landing an aircraft, comprising means for providing displacement signals corresponding to aircraft heading, means for receiving said displacement signals to provide synchronizing signals, means for summing said displacement and synchronizing signals to provide combined signals, means for providing heading rate signals, means for summing the combined signals and heading rate signals to provide control signals, means for providing roll attitude signals, means for summing the combined signals and roll attitude signals to provide other control signals, and means for receiving said first and second mentioned control signal to control the aircraft during the landing maneuver.

12. A system for aligning the longitudinal axis of an aircraft with the center line of the runway during a landing maneuver, comprising means for providing displacement signals corresponding to the heading of the aircraft relative to the runway heading, a synchronizer for receiving said displacement signals to provide synchronized displacement signals, means for summing said displacement and synchronized displacement signals to provide combined signals, a rate gyroscope for providing heading rate signals, means for summing the combined signals and the heading rate signals to provide rudder control signals, a roll gyroscope for providing roll attitude signals, means for combining the combined signals and roll attitude signals to provide aileron control signals and means responsive to said rudder and aileron control signals to control the aircraft during the landing maneuver.

13. An aircraft landing system, comprising means for providing displacement signals corresponding to the heading of the aircraft relative to the runway heading, means for synchronizing the displacement signals when the aircraft is above a predetermined altitude and for providing synchronizer signals corresponding to the heading displacement signals at the predetermined altitude when the aircraft is below the predetermined altitude, means for summing the displacement signals and the synchronizer signals to provide combined signals, means for providing heading rate signals, means for summing the combined signals and the heading rate signals to provide rudder control signals, a lag network for receiving the combined signals to provide lagging combined signals, means for providing roll attitude signals, means for combining the lagging combined signals and the roll attitude signals to provide aileron control signals, and means responsive to the rudder and aileron control signals to control the aircraft while landing.

14. A device for controlling an aircraft during runway approach and runway alignment maneuvers while landing the aircraft, comprising first means for providing heading displacement signals, second means for providing beam displacement signals, third means for synchronizing the heading displacement signals during the approach maneuver and for providing synchronizer signals corresponding to the heading displacement signals at the end of the approach maneuver during the alignment maneuver, fourth means for providing heading rate signals, fifth means for providing roll attitude signals, sixth means connected to the first, second and fifth means and responsive to the heading displacement signals, the beam displacement signals and the roll attitude signals for providing command signals, seventh means connected to the sixth means for limiting the command signals to provide limited command signals, eighth means connected to the first and third means and responsive to the heading displacement signals and the synchronizer signals for providing lagging synchronized heading displacement signals, aircraft control means, and means for connecting the aircraft control means to the fourth means, the fifth means, the sixth means and the seventh means for controlling the aircraft in response to the heading rate signals, the roll attitude signals, the command signals and the limited command signals during the approach maneuver and for connecting the aircraft control means to the first means, the third means, the fourth means, the fifth means, the seventh means and the eighth means for controlling the aircraft in response to the heading displacement signals, the synchronizer signals, the heading rate signals, the roll attitude signals, the limited command signals and the lagging synchronized heading displacement signals during the alignment maneuver.

15. A system for landing an aircraft, comprising means for providing heading displacement signals, means for synchronizing said heading displacement signals when the aircraft is above a predetermined altitude and for providing synchronizer signals corresponding to the heading displacement signals at the predetermined altitude, and means responsive to the heading displacement and synchronizer signals to control the aircraft below the predetermined altitude while landing.

16. A device for landing an aircraft, comprising first means for providing beam displacement signals, second means for providing heading displacement signals, third means for synchronizing the heading displacement signals when the aircraft is above a predetermined altitude and for providing synchronizer signals corresponding to the heading displacement signals at the predetermined altitude when the aircraft is below the predetermined altitude, aircraft control means, and means for connecting the aircraft control means to the first and second means for controlling the aircraft in response to the beam displacement and the heading displacement signals when the aircraft is above the predetermined altitude and for connecting the aircraft control means to the second and third means for controlling the aircraft in response to the heading displacement and synchronizer signals when the aircraft is below the predetermined altitude.

17. A device for controlling an aircraft above and below a predetermined altitude, comprising first means for providing beam displacement signals, second means for providing heading displacement signals, third means for synchronizing the heading displacement signals when the aircraft is above the predetermined altitude and for providing synchronizer signals corresponding to the heading displacement signals at the predetermined altitude when the aircraft is below the predetermined altitude, means connected to the first and second means for combining the beam displacement signals and the heading displacement signals to provide first combined signals, means connected to the second and third means for combining the heading displacement and synchronizer signals to provide second combined signals, means responsive to the first combined signals for controlling the aircraft when the aircraft is above the predetermined altitude, and altitude responsive means for rendering said last mentioned means responsive to the second combined signals and for rendering the first combined signals ineffective for controlling the aircraft when the aircraft is below the predetermined altitude.

18. A device for controlling an aircraft during runway approach and runway alignment maneuvers while landing the aircraft, comprising first means for providing beam displacement signals, second means for providing heading displacement signals, third means for synchronizing the heading displacement signals during the approach maneuver and for providing synchronizer signals corresponding to the heading displacement signals at the end of the approach maneuver during the alignment maneuver, aircraft control means, and means for connecting the aircraft control means to the first and second means for controlling the aircraft in response to the beam displacement signals and the heading displacement signals during the approach maneuver and for connecting the aircraft control means to the second and third means for controlling the aircraft in response to the heading displacement and synchronizer signals during the alignment maneuver.

19. A device for landing an aircraft, comprising first means for providing beam displacement signals, second means for providing heading displacement signals, third means for synchronizing the heading displacement signals when the aircraft is above a predetermined altitude and for providing synchronizer signals corresponding to the heading displacement signals at the predetermined altitude when the aircraft is below the predetermined altitude, means connected to the first and second means for controlling the aircraft in response to the beam displacement and the heading displacement signals when the aircraft is above the predetermined altitude, and altitude responsive means for rendering said last mentioned means responsive to the heading displacement signals and the synchronizer signals and for rendering the beam displacement signals ineffective to control the aircraft when the aircraft is below the predetermined altitude.

References Cited
UNITED STATES PATENTS

| | | | |
|---|---|---|---|
| 2,987,276 | 6/1961 | Osder et al. | 244—77 |
| 3,092,357 | 6/1963 | Prescott et al. | 244—77 |
| 3,110,458 | 11/1963 | Bishop | 244—77 |
| 3,120,934 | 2/1964 | Robertson | 244—77 |

MILTON BUCHLER, *Primary Examiner.*

B. BELKIN, *Assistant Examiner.*